US005731650A

United States Patent [19]

Scheucher

[11] Patent Number: 5,731,650

[45] Date of Patent: Mar. 24, 1998

[54] DYNAMOELECTRIC MACHINE WITH BRUSH WEAR SENSOR

[75] Inventor: Walfried F. Scheucher, Brook Park, Ohio

[73] Assignee: Lucas Aerospace Power Equipment Corp., Aurora, Ohio

[21] Appl. No.: 706,979

[22] Filed: Sep. 3, 1996

Related U.S. Application Data

[63] Continuation of Ser. No. 336,983, Nov. 14, 1994, abandoned.

[51] Int. Cl.$^6$ .......... H02K 13/00

[52] U.S. Cl. .......... 310/248; 310/242; 310/249

[58] Field of Search .......... 310/242, 245, 310/248, 249, 239

[56] References Cited

U.S. PATENT DOCUMENTS

| | | | |
|---|---|---|---|
| 4,024,525 | 5/1977 | Baumgartner et al. | 340/267 R |
| 4,316,186 | 2/1982 | Purdy et al. | 340/648 |
| 4,344,009 | 8/1982 | Reynolds | 310/242 |
| 4,344,072 | 8/1982 | Harper, Jr. | 340/648 |
| 4,348,608 | 9/1982 | Michael | 310/242 |
| 4,420,705 | 12/1983 | Kimberlin | 310/242 |
| 4,471,254 | 9/1984 | Yamada et al. | 310/242 |
| 4,488,078 | 12/1984 | Orton | 310/242 |
| 4,723,084 | 2/1988 | Reynolds | 310/247 |
| 4,739,208 | 4/1988 | Kimberlin | 310/242 |
| 4,743,787 | 5/1988 | Bunner et al. | 310/242 |
| 4,831,302 | 5/1989 | Dietrich et al. | 310/242 |

*Primary Examiner*—Thomas M. Dougherty
*Assistant Examiner*—Michael J. Wallace, Jr.
*Attorney, Agent, or Firm*—Rankin, Hill, Lewis & Clark

[57] ABSTRACT

A brush wear sensor for a dynamoelectric machine having a rotating commutator and brushes which contact the commutator detects movement of the brush a predetermined distance inwardly which indicates excessive wear of the brush. The brush wear sensor is normally electrically isolated from the brush and from the brush holder in which the brush is mounted. When excessive brush wear occurs, the brush wear sensor contacts the spring which moves the brush as it wears and urges the brush into contact with the commutator. The brush wear sensor is then electrically connected to the brush holder and the brush, providing an indication that the brush has moved the predetermined distance inwardly. The brush wear sensor allows the detection of excessive brush wear without disassembling and visually inspecting the brushes.

11 Claims, 4 Drawing Sheets

DYNAMOELECTRIC MACHINE WITH BRUSH WEAR SENSOR

This is a continuation of application Ser. No. 08/336,983, filed Nov. 14, 1994, now abandoned.

BACKGROUND OF THE INVENTION

1. Field of the Invention

This invention relates to dynamoelectric machines having commutators and wearable brushes, and more particularly to a sensor for detecting excessive brush wear and the need for brush replacement.

2. Description of the Prior Art

The common design of dynamoelectric machines, such as electrical generators, starters, or combination starter/generators, uses carbon brushes which contact a rotating commutator. A spring is often used to engage each brush within its brush holder and to push the brush into constant contact with the commutator. The constant engagement with the rotating commutator causes the brushes to wear. Eventually, when the brushes have worn excessively, they must be replaced. If the brushes are not replaced when they become excessively worn, the generator can be seriously damaged and can stop operating.

In the past, it has been necessary to visually inspect the brushes periodically to assure that the brushes still have sufficient life and that the operation of the motor or generator can be continued with the existing brushes. This was particularly important with respect to starter/generators used in aircraft, since failure of one of the brushes could result in failure of the starter/generator which could have serious consequences. If a brush is worn excessively short, it can result in damage to the generator, and this can effect the entire aircraft electrical system. Therefore, routine periodic visual inspection of the brushes has been essential to avoid unexpected starter/generator failure. However, in order to perform the inspection, it has been necessary to remove the starter/generator from the aircraft engine, and such inspections have been inconvenient, time-consuming and expensive.

Nevertheless, routine periodic inspections of the brushes have been necessary because brush life is difficult to estimate. Depending upon the conditions in which the starter/generator operates, the rate at which the brushes wear can vary significantly. Because of the difficulties in predicting when the brushes would need to be replaced and the consequences of incorrectly predicting brush wear, the inspection of the brushes had to be scheduled to be performed far more often than was necessary for actual brush replacement, resulting in wasted time and money.

It would, therefore, be desirable to have the ability to predict or detect excessive brush wear before the brushes have worn excessively without the necessity of removing and disassembling the generator.

SUMMARY OF THE INVENTION

The present invention overcomes the problems of the prior art and provides other advantages that have not be realized heretofore. In accordance with the present invention, it is possible to detect excessive brush wear without disassembling and visually inspecting the brushes.

The present invention provides a brush wear sensor which is included in the brush mounting assembly. The brush wear sensor automatically monitors brush wear and provides an indication when the brush has worn an excessive amount.

Since the brush wear sensor is built into the brush mounting assembly, there is no need to disassemble the generator to visually inspect the brush and determine brush wear. Furthermore, since the brush wear sensor operates automatically, excessive brush wear can be detected even if periodic maintenance of the generator is not performed. The brush wear sensor thus avoids the dependence upon periodic inspections of the generator to detect brush wear. The brush wear sensor functions automatically to avoid damage to the generator and improve aircraft safety.

The brush wear sensor is connected to an indicator in the cockpit which indicates to the pilot that any of the brushes have reached minimum brush safe life. This minimum brush safe life can be set at any desired point in which the life of the brushes has been fully utilized but with sufficient brush life remaining to provide sufficient time to operate the generator before the brushes can be replaced. Preferably, the sensor is set to provide a warning indication when a brush has been used for 90% of its life.

The brush wear sensor of the present invention improves the reliability of the generator and reduces maintenance costs for the operator of the aircraft. The sensor is extremely reliable, having only a single moving part, and this moving part being a simple flexible spring member. The brush wear sensor does not require any special wiring or power supply. It uses the output voltage from the generator to operate the wear sensor circuit.

The brush wear sensor includes a modification of the existing brush mounting assembly which includes a insulated base and a stainless steel spring member, with a nickel plated contact on each end of the spring member. As the brush wears, the brush spring follows the brush radially inwardly until it contacts the brush wear sensor. This contact closes a circuit which activates the indicator light in the cockpit, advising the pilot that the brush has worn to the point that replacement is needed and that 90% of the brush life has been used.

These and other advantages are provided by the present invention of a dynamoelectric machine which comprises a rotatable commutator and a brush mounted for contacting the commutator. The brush is movable toward the commutator as the brush wears. Means are provided for moving the brush as it wears and for urging the brush into contact with the commutator. The brush wear sensor has means for detecting movement of the brush a predetermined distance inwardly indicating excessive wear of the brush.

Preferably, the brush wear sensor is normally electrically isolated from the brush and from the brush holder in which the brush is mounted, and the brush wear sensor contacts the spring which provides the means for moving the brush as it wears and for urging the brush into contact with the commutator, and the brush wear sensor is then electrically connected to the brush holder and the brush, providing an indication that the brush has moved the predetermined distance inwardly.

DETAILED DESCRIPTION OF THE PREFERRED EMBODIMENT

Figure 1:
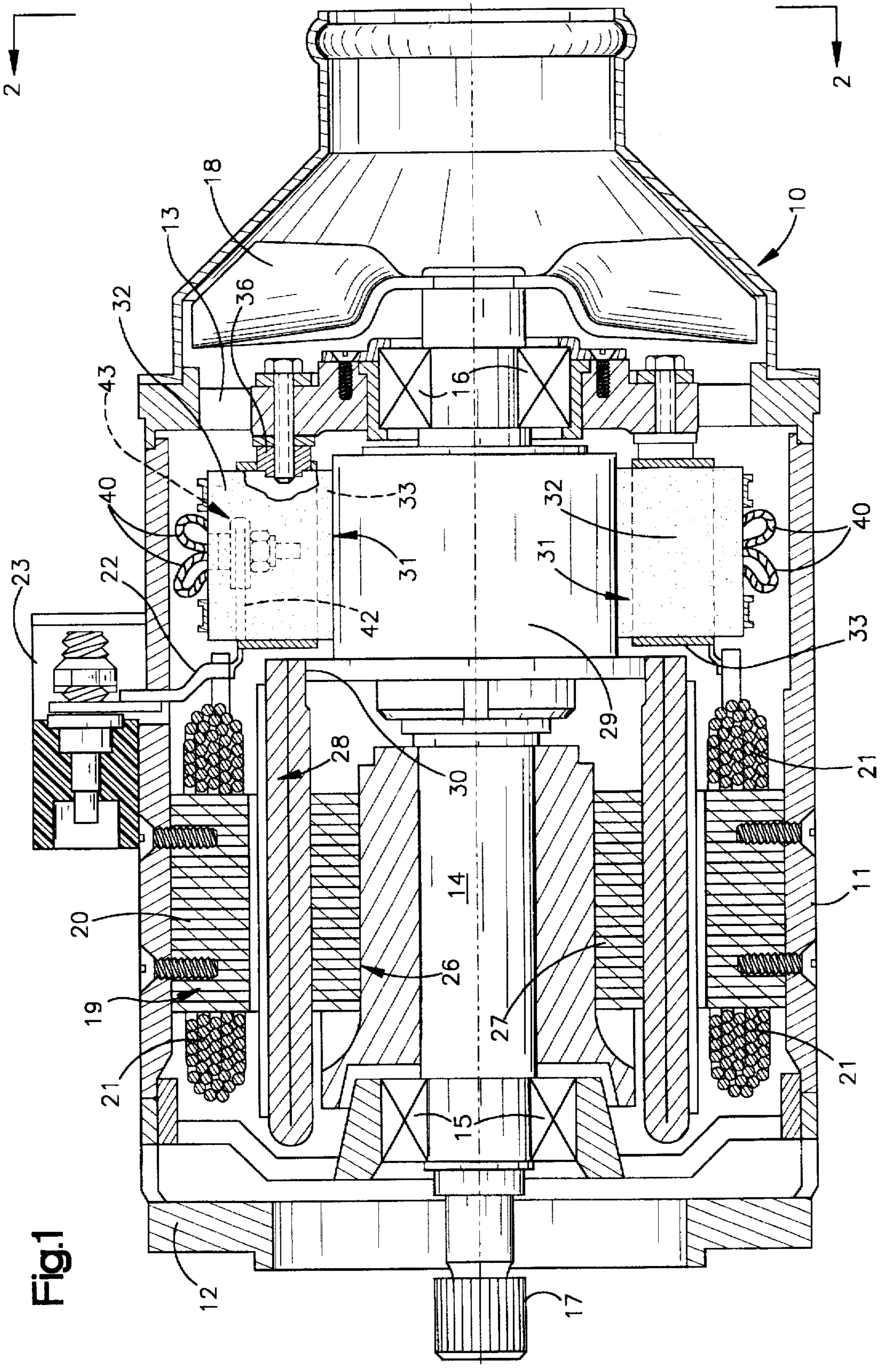
FIG. 1 is a a side sectional view of a dynamoelectric machine incorporating the present invention.
Figure 2:
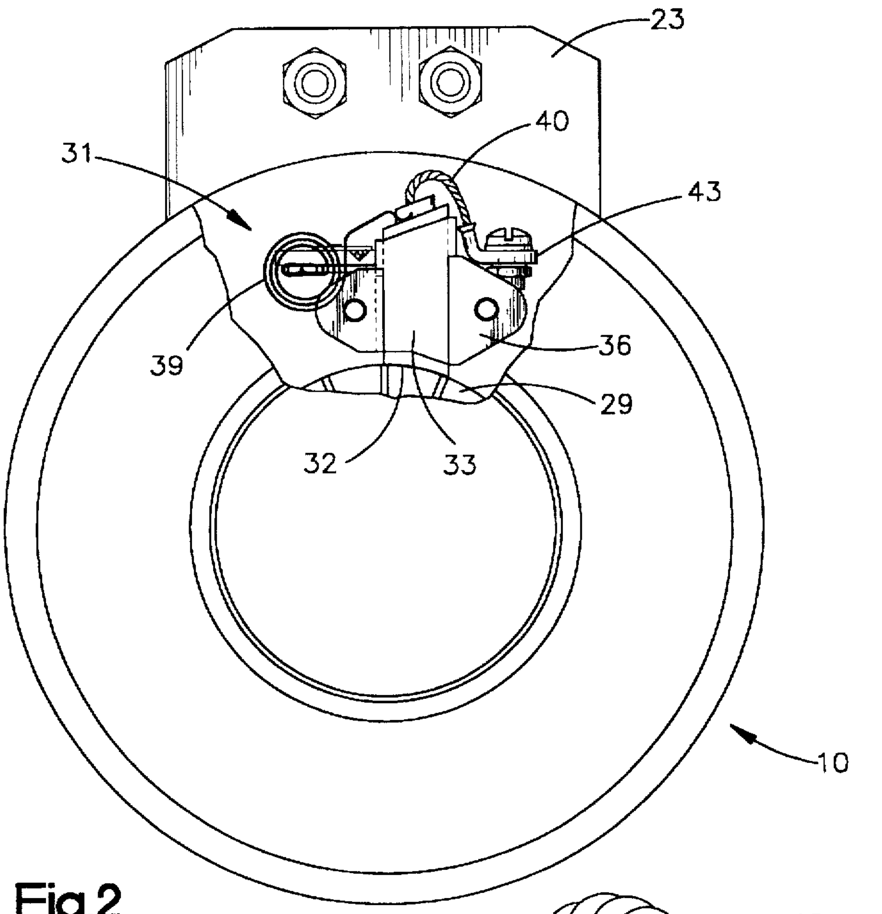
FIG. 2 is an end elevational view, partially sectioned, of one of the brushes, taken along line 2—2 of FIG. 1.

Referring more particularly to the drawings and initially to FIG. 1, there is shown a typical dynamoelectric machine in the form of a conventional DC electric starter/generator 10 which has been modified to use the improvement of the present invention. The generator 10 has an outer housing 11 including an end shield assembly 12 and a support assembly 13. A shaft 14 is centrally mounted for rotation and supported by bearing assemblies 15 and 16 adjacent to the end shield assembly 12 and the support assembly 13, respectively. The shaft 14 has a drive connection 17 at one end and a fan 18 at the other end. Mounted within the housing 11 is a field or stator assembly 19 comprising a laminated stator core 20 supporting a plurality of windings 21. The stator windings 21 are connected to a stator winding terminal 22 through which current enters the generator 10 by suitable connections to a terminal block 23 mounted outside the housing 11.

An armature 26 is supported on the rotatable shaft 14. The armature 26 includes a laminated core 27 and a plurality of armature windings 28. A commutator 29 is supported on one end of the shaft 14 and connected through commutator risers 30 to the armature windings 28. Electrical contact brush assemblies 31 are supported for contact with the commutator 29. Each of the brush assemblies 31 comprises a pair of brushes 32 usually of a carbon composition which is held within a brush holder 33 commonly made of stainless steel or other similar material. In the embodiment shown, the generator 10 is a four-pole device showing two pairs of brushes assemblies 31.

Each brush holder 33 surrounds and supports the brushes 32 therein with the brushes extending slightly beyond the bottom edge of the holder so that the holder does not rub against the commutator 29. The brush holder 33 has flanges 36 at one end for attaching the holder to the support assembly 13. The brush holder 33 also has a generally T-shaped spring support 37 extending outwardly on one side and a terminal support 38 extending outwardly on the other side. The spring support 37 is used to mount brush springs 39 along one side of the holder 33. The springs 39 engage the brush and push the brush 32 radially inwardly toward the commutator 29 to maintain constant contact with the commutator 29 as the brush wears. For providing the current path to and from the brushes, each brush assembly 31 has an attached shunt or lead 40 having a terminal 41 at the end thereof. The brush leads 40, which are usually formed of stranded copper, make an electrical connection with the stator windings 21 through a lead 42 from the stator winding terminal 22. The junction 43, at which the terminal 41 is connected to the stator lead 42, is supported on the terminal support 38 formed along the side of the brush holder 33 opposite the brush springs 39, and secured with means such as a screw and nut.

Figure 3:
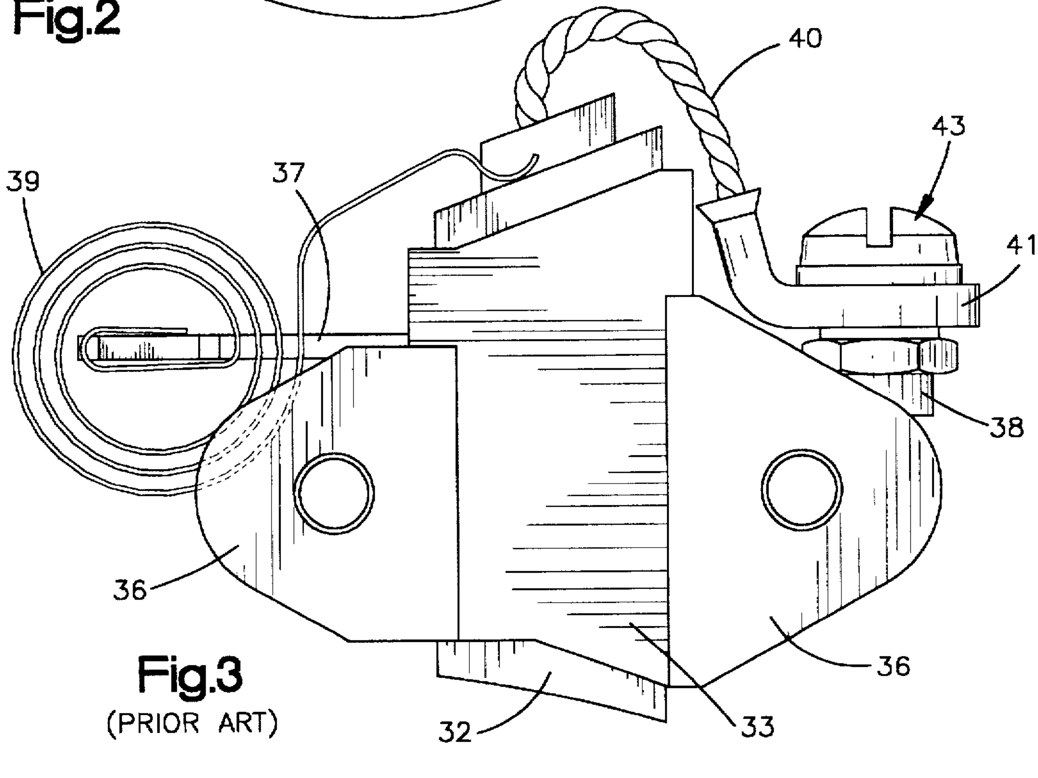
Fig.3 (PRIOR ART)
FIG. 3 is an enlarged end elevational view of the brush mounting assembly of the prior art.

The common configuration of the brush assembly of the prior art is shown in more detail in FIG. 3. As shown in FIG. 3, the brush springs 39 each have a central portion wound around the spring support 37 which is connected to the brush holder 33 and a outwardly extending portion which contacts the top of the brush 32 and pushes the brush inwardly toward the commutator 29.

Figure 4:
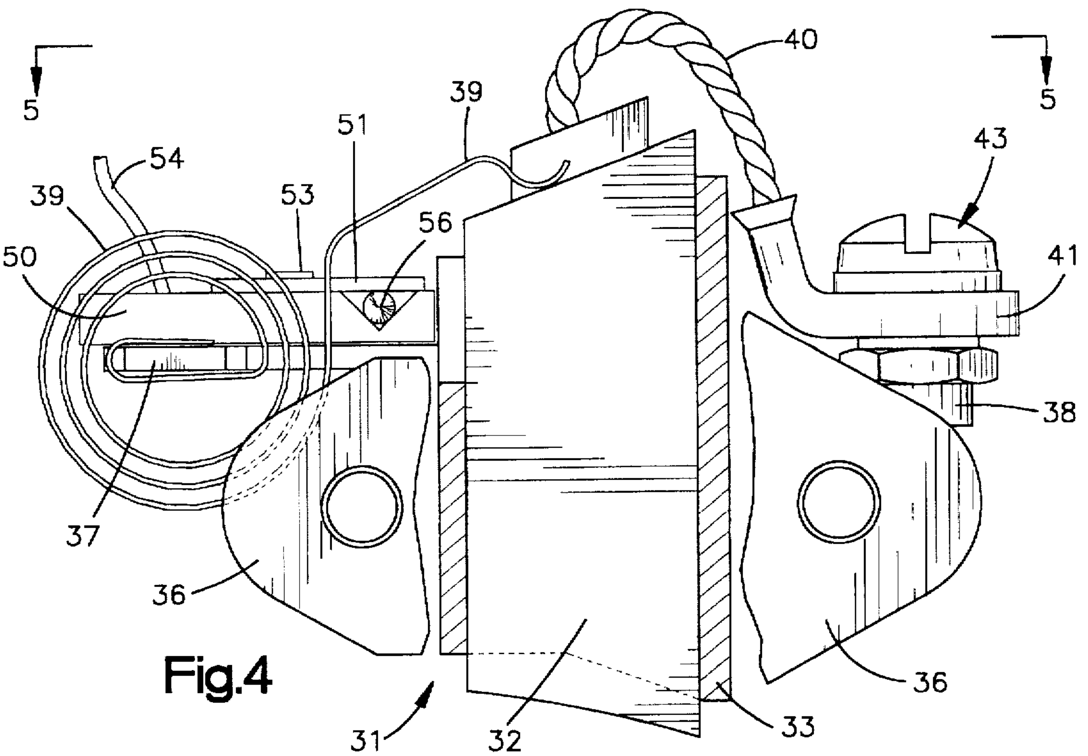
FIG. 4 is an enlarged end elevational view of the brush mounting assembly of FIG. 2 to a larger scale, similar to the view of FIG. 3, showing the brush mounting assembly of the present invention.
Figure 5:
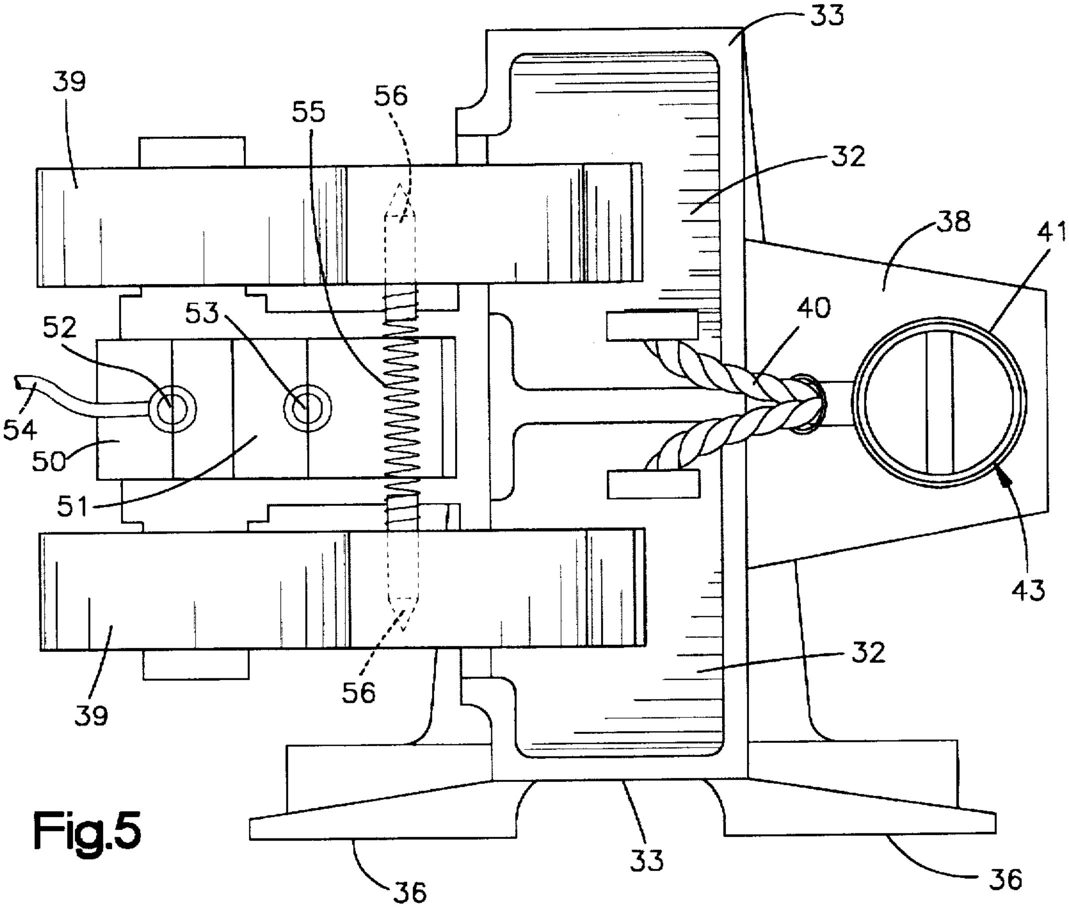
FIG. 5 is a top plan view of the brush taken along line 5—5 of FIG. 4.

In accordance with the present invention, the prior art configuration of brush assembly of FIG. 3 is replaced by the brush assembly 31 of FIG. 4. The brush springs 39 are mounted on the spring support 37 as before. An insulated mounting pad 50 is also attached to the outer surface of the spring support 37, and an electrically conductive clamping plate 51 is mounted on the outer side of the pad 50. The pad 50 is attached to the spring support 37 by means of a suitable fastener such as a rivet 52, and the clamping plate 51 are attached to the pad 50 by means of a suitable fastener such as a rivet 53. The pad 50 may be made of any suitable insulating material, such as G-11. The clamping plate 51 is formed of a material having good electrically conductive properties, such as brass. A lead 54 is attached to the clamping plate 51 and extends to a brush sensor circuit. The pad 50 has a V-shaped groove therein in which a flexible spring member 55 is located and held in place by the clamping plate 51. The spring member 55 extends outwardly from each side of the spring support 37. The flexible spring member 55 is also electrically conductive, and it can be made of stainless steel. A pair of contacts 56 are mounted on each outwardly extending end of the flexible spring member 55. Each of the contacts is also electrically conductive and can be made of brass and nickel plated. As shown in FIG. 4, the spring member 55 holds the contacts 56 such that they are located outwardly from the spring support 37 and extend directly below or radially inside of each of the brush springs 39. The length of the spring member 55 depends upon the size of the brushes, with the spring member being of sufficient length to position each of the contacts 56 within the brush springs 39.

When the brushes 32 are relatively new, the brush spring 39 is spaced from the contacts 56 as shown in FIG. 4. The clamping plate 51 is electrically insulated from the brush 32 by means of the pad 50, so that there is no current flow through the lead 54 which is attached to the clamping plate, and the lead 54 can be at a different voltage level than the brush. As the brush wears, the spring 39 associated with that brush pushes the brush 32 radially inwardly to maintain contact with the commutator 29, and the top of the brush moves radially inwardly with respect to the brush holder 33 (or downwardly as shown in FIGS. 4 and 6).

Figure 6:
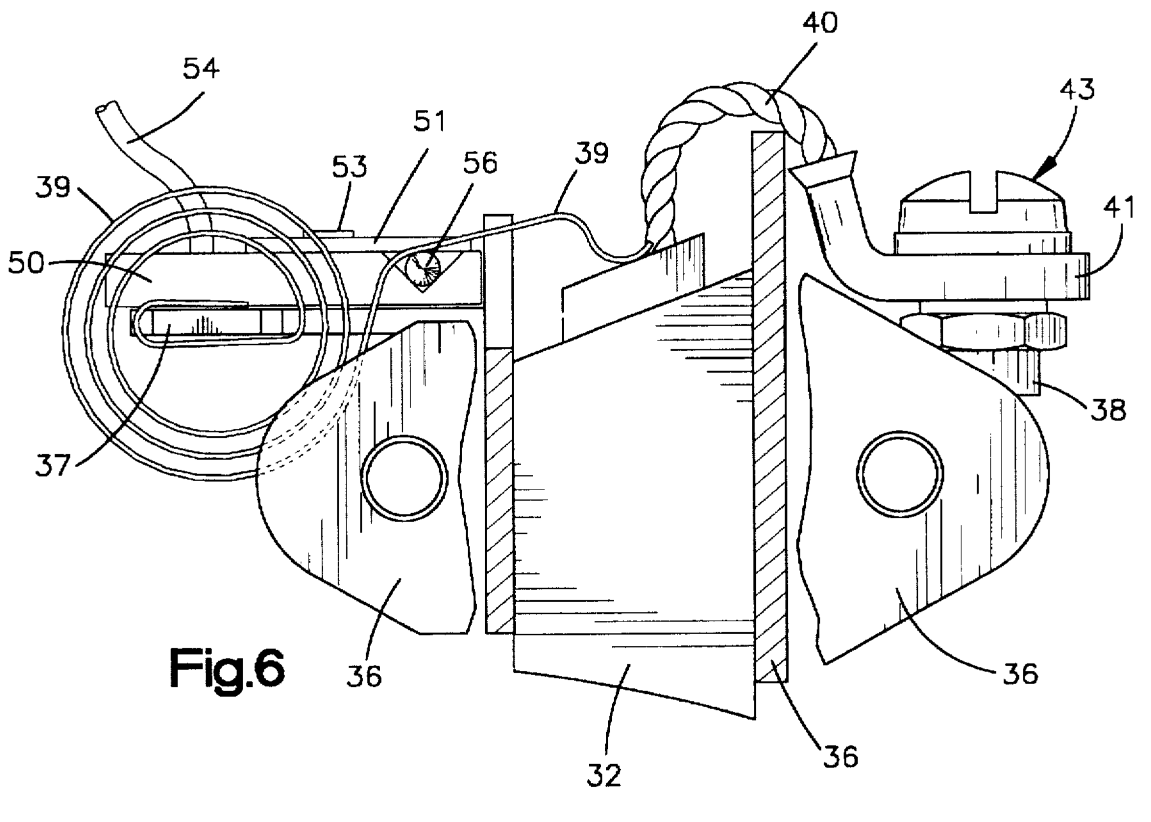
FIG. 6 is a side elevational view, similar to FIG. 4, showing the brush mounting assembly when the brush has worn.

When the brush wear becomes sever, the brush 32 reaches the position shown in FIG. 6 in which the brush has moved substantially radially inwardly within the brush holder 33. The brush spring 39 then comes into contact with one of the contacts 56, and current is conducted from the brush 32 through the brush holder 33, the spring support 37 and the brush spring 39 through the contact 56, the flexible spring member 55 to the clamping plate 51. The clamping plate 51 thus achieves approximately the same voltage level as the brush 32. The brush voltage is thus conducted to the brush wear sensor circuit by the lead 54 which is attached to the clamping plate. The brush wear sensor circuit may be used to detect the current flow through the lead 54 and to trigger a warning signal in the cockpit of the aircraft. The warning signal would alert the flight crew that the brush wear sensor has detected excessive brush wear and that the brushes should be replaced as soon as possible. Preferably, the brush wear sensor is configured such that the brush spring 39 will touch the contact 56 when the brush has become 90% worn, allowing some additional brush wear to take place prior to replacement and allowing the aircraft to continue safe operation until the brushes can be replaced. The flexible sensor spring member 55 prevents the contact 56 from interfering with the continued operation of the larger brush spring 39, and the brush spring 39 can continue to push the brush 32 radially inwardly within the brush holder 33 as the brush wears, with the sensor spring member 55 bending to accommodate continued movement of the brush spring 39.

It is noted that the brush wear sensor does not require any external power supply since it utilizes the voltage within the brush itself. Thus the brush wear sensor can be incorporated into existing generators or motors with very little modification. The sensor consists of only a few parts mounted onto the spring support of the brush holder and connected to a brush wear sensor circuit by a lead.

Other variations and modifications of the specific embodiments herein shown and described will be apparent to those skilled in the art, all within the intended spirit and scope of the invention. While the invention has been shown and described with respect to particular embodiments thereof, these are for the purpose of illustration rather than limitation. Accordingly, the patent is not to be limited in scope and effect to the specific embodiments herein shown and described nor in any other way that is is inconsistent with the extent to which the progress in the art has been advanced by the invention.

What is claimed is:

1. A dynamoelectric machine, which comprises:

a rotatable commutator;

a brush mounted in a brush holder for contacting the commutator, the brush being movable within the brush holder toward the commutator as the brush wears;

a spring arm for moving the brush within the brush holder as the brush wears and for urging the brush into contact with the commutator, a portion of the spring arm moving with the movement of the brush within the brush holder; and a brush wear sensor for detecting movement of the brush a predetermined distance inwardly indicating excessive wear of the brush, the sensor comprising a flexible member mounted on the brush holder with a conductive contact which directly contacts said portion of the spring arm and electrically connects with the spring arm when the brush moves the predetermined distance inwardly, the flexibility of the flexible member permitting the spring arm to continue moving the brush within the brush holder after the spring arm has contacted the conductive contact to allow continued safe operation of the machine.

2. A dynamoelectric machine as defined in claim 1, wherein the brush wear sensor is electrically isolated from the brush and becomes electrically connected to the brush when the brush has moved the predetermined distance inwardly.

3. A dynamoelectric machine as defined in claim 1, wherein the brush is mounted in a brush holder and the spring arm comprises a spring mounted on the brush holder.

4. A dynamoelectric machine as defined in claim 1, wherein the brush wear sensor includes a lead for attachment to a brush wear sensing circuit.

5. A dynamoelectric machine as defined in claim 1, wherein the flexible member extends from the brush holder in a direction generally laterally to a plane in which the spring arm moves as it urges the brush into contact with the commutator.

6. A dynamoelectric machine as defined in claim 1, wherein the spring arm forms part of an electrical circuit for providing an indication of excessive brush wear.

7. A dynamoelectric machine, which comprises:

a stator;

a rotatable shaft within the stator;

an armature attached to the shaft;

a commutator mounted on the shaft and connected to the armature;

a brush mounted in a brush holder for contacting the commutator, the brush moveable within the brush holder toward the commutator as the brush wears;

a spring arm mounted on the brush holder and engaging the brush within the brush holder, the spring arm moving the brush within the brush holder as the brush wears and urging the brush into contact with the commutator, a portion of the spring arm moving with the movement of the brush within the brush holder; and a brush wear sensor mounted on the brush holder for sensing when the brush moves a predetermined distance inwardly indicating excessive wear of the brush, the sensor comprising a flexible member mounted on the brush holder with a conductive contact which directly contacts said portion of the spring arm and electrically connects with the spring arm when the brush moves the predetermined distance inwardly, the flexibility of the flexible member permitting the spring arm to continue moving the brush within the brush holder after the spring arm has contacted the conductive contact.

8. A dynamoelectric machine as defined in claim 7, wherein the spring arm is electrically connected to the brush and the brush holder, and wherein the contact is electrically isolated from the brush holder until it contacts the spring arm.

9. A dynamoelectric machine as defined in claim 7, wherein the brash wear sensor includes a lead for attachment to a brash wear sensing circuit.

10. A dynamoelectric machine as defined in claim 7, wherein the flexible member extends from the brush holder in a direction generally laterally to a plane in which the spring arm moves as it urges the brush into contact with the commutator.

11. A dynamoelectric machine as defined in claim 7, wherein the spring arm forms part of an electrical circuit for providing an indication of excessive brush wear.

* * * * *

UNITED STATES PATENT AND TRADEMARK OFFICE
CERTIFICATE OF CORRECTION

PATENT NO : 5,731,650

DATED : March 24, 1998

INVENTOR(S) : Scheucher, Walfried F.

It is certified that error appears in the above-identified patent and that said Letters Patent is hereby corrected as shown below:

Column 6, line 45, "brash" should be --brush--.
Column 6, line 46, "brash" should be --brush--.

Signed and Sealed this

Nineteenth Day of May, 1998

Attest:

Bruce Lehman

BRUCE LEHMAN

*Attesting Officer* *Commissioner of Patents and Trademarks*